United States Patent
Takeuchi et al.

(10) Patent No.: US 7,377,533 B2
(45) Date of Patent: May 27, 2008

(54) STEERING DAMPER APPARATUS, AND METHOD OF USING SAME

(75) Inventors: Yoshiaki Takeuchi, Saitama (JP); Makoto Ono, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 11/045,794

(22) Filed: Jan. 28, 2005

(65) Prior Publication Data

US 2005/0173911 A1 Aug. 11, 2005

(30) Foreign Application Priority Data

Feb. 5, 2004 (JP) ............................. 2004-029443

(51) Int. Cl.
*B62K 21/00* (2006.01)

(52) U.S. Cl. .................................... 280/272; 280/5.515

(58) Field of Classification Search ................ 280/272, 280/5.515; 701/41
See application file for complete search history.

(56) References Cited

U.S. PATENT DOCUMENTS

| | | | | |
|---|---|---|---|---|
| 4,787,650 A * | 11/1988 | Doi et al. ................. | 280/5.515 |
| 4,811,807 A | 3/1989 | Schier | |
| 6,708,795 B2 * | 3/2004 | Hasegawa et al. .......... | 180/423 |
| 6,742,794 B2 * | 6/2004 | Bunya et al. ................ | 280/272 |
| 6,817,265 B2 * | 11/2004 | Hasegawa et al. .......... | 74/551.1 |
| 6,824,153 B2 * | 11/2004 | Hanawa et al. ............. | 280/272 |
| 6,848,698 B2 * | 2/2005 | Hasegawa et al. .......... | 280/272 |
| 7,021,433 B2 * | 4/2006 | Yamada et al. ............. | 188/294 |
| 7,044,489 B2 * | 5/2006 | Bunya et al. ................ | 280/272 |
| 2002/0157909 A1 | 10/2002 | Hasegawa et al. | |
| 2003/0127824 A1 * | 7/2003 | Hasegawa et al. .......... | 280/272 |
| 2003/0132598 A1 * | 7/2003 | Bunya et al. ................ | 280/272 |
| 2004/0239069 A1 * | 12/2004 | Yamada et al. ............. | 280/272 |

FOREIGN PATENT DOCUMENTS

EP 1248013 10/2002
JP 2002302085 A 10/2002

* cited by examiner

*Primary Examiner*—Christopher P. Ellis
*Assistant Examiner*—Maurice Williams
(74) *Attorney, Agent, or Firm*—Carrier Blackman & Associates, P.C.; William D. Blackman; Joseph P. Carrier

(57) ABSTRACT

A steering damper is provided coaxially with a steering shaft, and a handlebar load is provided by causing a variable valve to generate damping force, using rotation of the steering shaft. The damping force is variably controlled in response to vehicle speed. The damping force is fixed to a minimum value C1 for vehicle speeds equal to or below first reference speed V1, fixed to a maximum value C2 for vehicle speeds equal to or above second reference speed V2, and variably controlled in response to vehicle speed and acceleration in an intermediate speed range. Fine maneuverability of a vehicle body is achieved by reducing a load on a handlebar at low vehicle speeds, and a stable movement of the vehicle body is maintained at high vehicle speed by increasing the load on the handlebar and thereby suppressing deflection of the handlebar.

17 Claims, 8 Drawing Sheets

FIG. 7

| CAR SPEED / ACCELERATION | CAR SPEED LATTICE POINT 1 | ~ | ~ | CAR SPEED LATTICE POINT i | ~ | ~ | CAR SPEED LATTICE POINT n |
|---|---|---|---|---|---|---|---|
| ACCELERATION LATTICE POINT 1 | CONTROL CURRENT (1, 1) | | | CONTROL CURRENT (i, 1) | | | CONTROL CURRENT (n, 1) |
| ~ | | | | | | | |
| ~ | | | | | | | |
| ACCELERATION LATTICE POINT j | CONTROL CURRENT (1, j) | | | CONTROL CURRENT (i, j) | | | CONTROL CURRENT (n, j) |
| ~ | | | | | | | |
| ~ | | | | | | | |
| ACCELERATION LATTICE POINT n | CONTROL CURRENT (1, n) | | | CONTROL CURRENT (i, n) | | | CONTROL CURRENT (n, n) |

STEERING DAMPER APPARATUS, AND METHOD OF USING SAME

CROSS-REFERENCE TO RELATED APPLICATIONS

The present invention claims priority under 35 USC 119 based on Japanese patent application No. 2004-029443, filed on Feb. 5, 2004. The subject matter of the referenced priority document is incorporated by reference herein.

BACKGROUND OF THE INVENTION

1. Field of the Invention

This invention relates to a steering damper apparatus for a motorcycle. More particularly, the present invention relates to a steering damper apparatus in which operation of a steering damper is regulated by an electronic controller to provide a variable damping force, relative to vehicle speed and/or acceleration.

2. Description of the Background Art

A steering damper apparatus configured to generate a damping force against rotation of a steering shaft, to avoid deflection of a handlebar attributable to a kickback upon a disturbance, is well known. Moreover, steering damper devices which provide variable damping forces so as to generate a damping force only when necessary, and to not generate an unnecessary damping force in other cases is also well known. Examples of this type of steering damper apparatus include one configured to control damping force based on a steering angle and traveling speed, one configured to control damping force based on variation in a load on a front wheel, and the like. In addition, kickback is apt to occur as the load on a front wheel is reduced upon acceleration of the vehicle. Japanese Unexamined Patent Publication No. 2002-302085 discloses a steering damper apparatus configured to suppress kickback by detecting an increase in acceleration, and causing a steering damper to generate a suitable damping force in advance.

A preventive increase in the damping force is sufficient to suppress kickback. However, in so doing, there may be a case where the steering damper apparatus provides a load on a handlebar which becomes excessive upon a turn in a low speed range when nimble handling is required. Accordingly, under these types of conditions, it is desirable to reduce the steering damper apparatus-induced load on the handlebar.

On the other hand, when driving straight at high speeds, it is desirable that the handlebar not be deflected easily, and thereby to increase the damping force. However, the conventional steering damper apparatus, targeted for suppressing deflection of the handlebar in the event of the kickback, cannot always achieve such an effect.

SUMMARY OF THE INVENTION

Accordingly, it is an object of the present invention to provide a steering damper which increase a damping force applied to the handlebar when a motorcycle is driving straight at high speeds. To attain the object, a steering damper apparatus according to the invention is configured to apply damping force to a rotational operation (for example, when the handlebars are turned by a rider) of a front wheel steering system supported by a front portion of a vehicle body. The inventive steering damper apparatus provides a damping force having a variable magnitude, and includes controlling means for adjusting the damping force of the steering damper. The controlling means is characterized in that the damping force is adjusted based on vehicle speed. Specifically, the damping force is fixed at a minimum force level when the vehicle speed is equal to or below a first reference speed, and the damping force is fixed at a maximum force level when the vehicle speed is equal to or above a second reference speed which is greater than the first reference speed.

The inventive steering damper apparatus is further characterized in that the controlling means variably adjusts the damping force in response to a variation in the vehicle speed when the vehicle speed is in an intermediate speed range between the first reference speed and the second reference speed.

The inventive steering damper apparatus is further characterized in that only when the vehicle speed is in the intermediate speed range, the controlling means considers acceleration as a parameter in addition to the vehicle speed, and causes the damping force to vary depending on both the vehicle speed and the acceleration of the vehicle body.

The inventive steering damper apparatus is yet further characterized in that in the intermediate speed range discussed above, the damping force is adjusted to a high level when the acceleration of the vehicle is at a high level.

According to one aspect of the invention, the controlling means adjusts the damping force based on the vehicle speed, fixes the damping force to the minimum when the vehicle speed is equal to or below the first reference speed, and fixes the damping force to the maximum when the vehicle speed is equal to or above the second reference speed greater than the first reference speed. Accordingly, in a speed range where nimble handling is required, it is possible to minimize the steering damper apparatus-induced load on a handlebar and thereby to improve maneuverability of the vehicle body. Moreover, it is possible to maintain a stable movement of the vehicle body by increasing the damping force in a higher speed range and thereby maximizing the steering damper apparatus-induced load on the handlebar so as to suppress deflection of the handlebar.

According to another aspect of the invention, the damping force is variably adjusted by the controlling means in response to the variation in the vehicle speed when the vehicle speed is in the intermediate speed range between the first reference speed and the second reference speed. Accordingly, it is possible to adjust the damping force to balance between the maneuverability of the vehicle body and suppression of deflection of the handlebar when moving in the intermediate speed range. Simultaneously, it is also possible to suppress deflection of the handlebar due to a kickback.

According to another aspect of the invention, the controlling means adjusts the damping force while using the vehicle speed and the acceleration as the parameters only in the intermediate speed range. Accordingly, it is possible to further ensure suppression of deflection of the handlebar due to a kickback.

According to yet another aspect of the invention, when in the intermediate speed range, the damping force is adjusted to a high level when the acceleration of the vehicle is at a high level. Accordingly, it is possible to further ensure suppression of deflection of the handlebar due to a kickback.

Selected examples of modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 7 is a table describing the control current map of FIG. 6.

DETAILED DESCRIPTION OF THE INVENTION

An embodiment will be described below with reference to the drawings.

Figure 1:
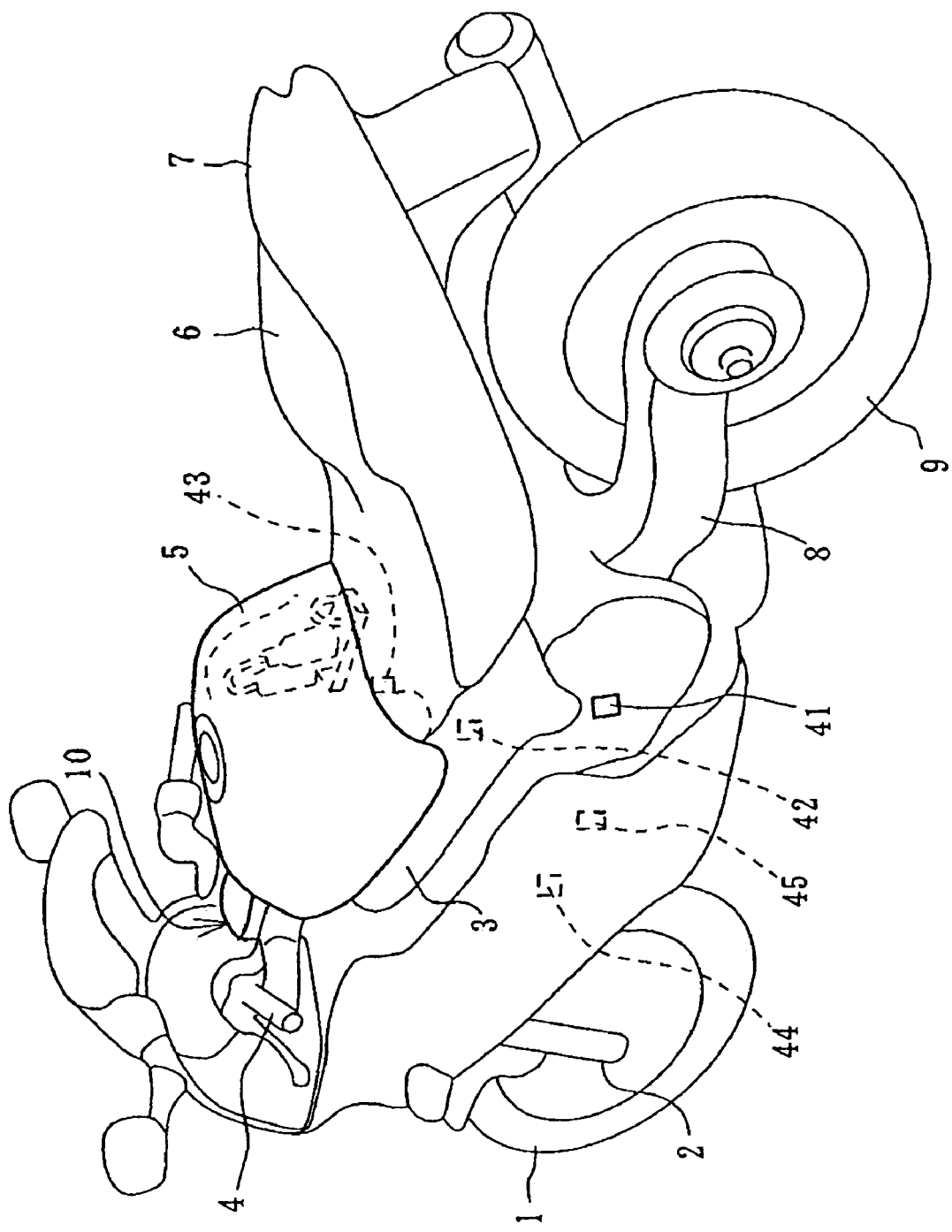
FIG. 1 is a perspective view of a motorcycle showing the inventive steering damper apparatus mounted thereon.

FIG. 1 is a perspective view of a motorcycle having the inventive steering damper apparatus provided thereon. In FIG. 1, a front fork 2 supports a front wheel 1 at a lower end and is connected at an upper end to a front portion of the motorcycle body frame 3. The front fork 2 is rotated by operation of the handlebar 4. A fuel tank 5 is supported on the vehicle body frame 3. The motorcycle also includes a seat 6, a rear cowl 7, a rear swing arm 8, and a rear wheel 9.

Figure 2:
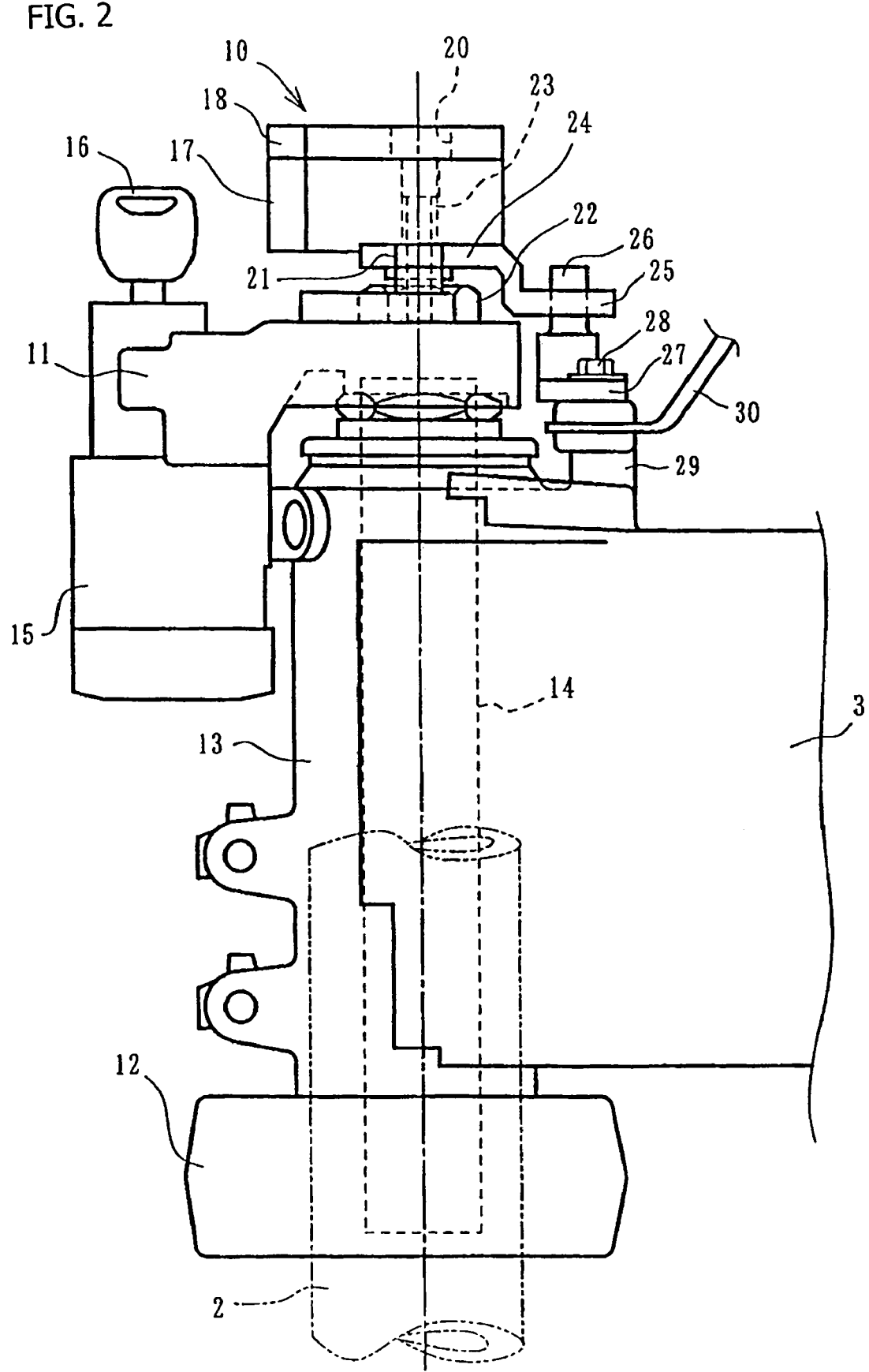
FIG. 2 is a side view of a front portion of a vehicle body showing the position of the steering damper apparatus in relation to the steering shaft and body frame.
Figure 3:
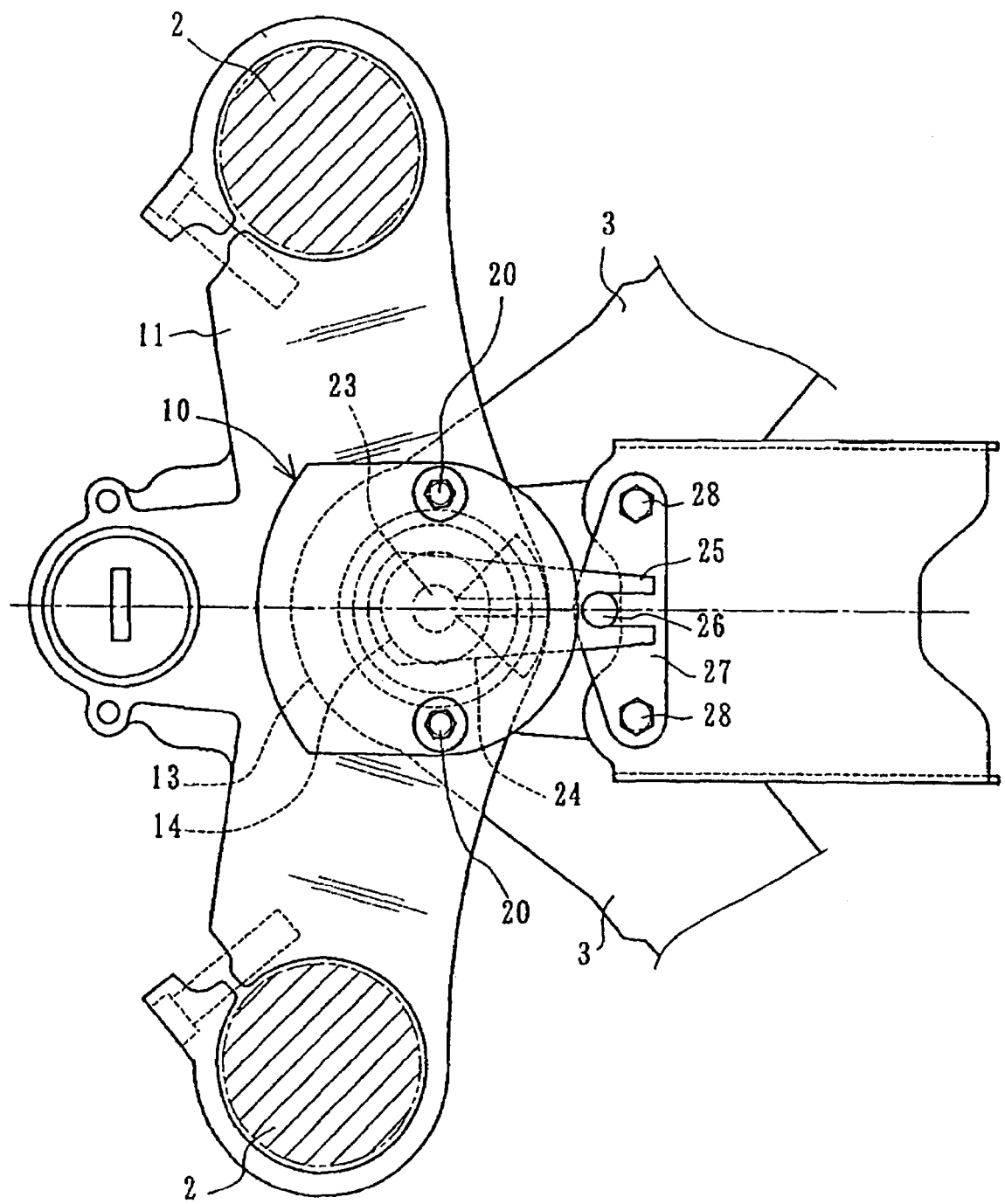
FIG. 3 is a top plan view of a front portion of a vehicle body of FIG. 2, showing the position of the steering damper apparatus in relation to the steering shaft and body frame.

Next, a steering damper will be described. As shown in FIGS. 2 and 3, a steering damper 10 is provided between a top bridge 11 to which the handlebar 4 is attached, and a front end portion of the vehicle body frame 3. The top bridge 11 is a member which vertically sandwiches, and is thereby integrated with, a steering shaft 14 (indicated by a center line). The top bridge 11 is supported by a head pipe 13 with a bottom bridge 12 placed below. The top bridge 11, the bottom bridge 12, and the steering shaft 14 rotate integrally.

Right and left upper portions of the front fork 2 are respectively supported by the top bridge 11 and the bottom bridge 12. The head pipe 13 is a pipe-shaped portion integrated with the front end portion of the vehicle body frame 3, and the vehicle body frame 3 forms a right and left pair of frame members which extend backward from the head pipe 13 (FIG. 3). A steering lock 15 is provided in front of the head pipe 13, which is unlocked by a key 16.

The steering damper 10 of this embodiment is a hydraulic damper for preventing a kickback. which includes a main damper body 17 and a lid 18, and is fastened to a nut portion provided on a boss 21 on the top bridge 11, by use of a bolt 20. In this case, the main damper body 17 and the lid 18 are also integrated by the bolt 20. Reference numeral 22 denotes a nut for connecting the top bridge 11 and an upper end of the steering shaft 14.

As shown in FIG. 2, a shaft 23 is provided inside the steering damper 10 such that an axial line thereof is directed in a vertical direction. A lower end of the shaft 23 protrudes downwardly from the main damper body 17 and is integrated with a front end of an arm 24. The shaft 23 is disposed coaxially with the steering shaft 14.

The arm 24 is bent into a crank shape, as viewed from the side, and extends in a front and back direction relative to the center of the vehicle body as viewed from above, whereby a front end portion thereof protrudes upward from the nut 22, and is integrated with the shaft 23 protruding into the steering damper 10. A rear end portion of the arm 24 constitutes a fork portion 25 which is engaged with a boss portion 26 on the vehicle body frame 3.

The boss portion 26 is provided so as to protrude upward toward a central portion of a bracket 27, and both right and left ends of the bracket 27 are fitted to an upwardly projecting boss 29 by use of a bolt 28. The upwardly projecting boss 29 is provided in the center at a front end portion of the front wheel 1. A stay 30, protruding out of a front end of the fuel tank 5, is fastened onto the boss 29 by the bolt 28.

Figure 4:
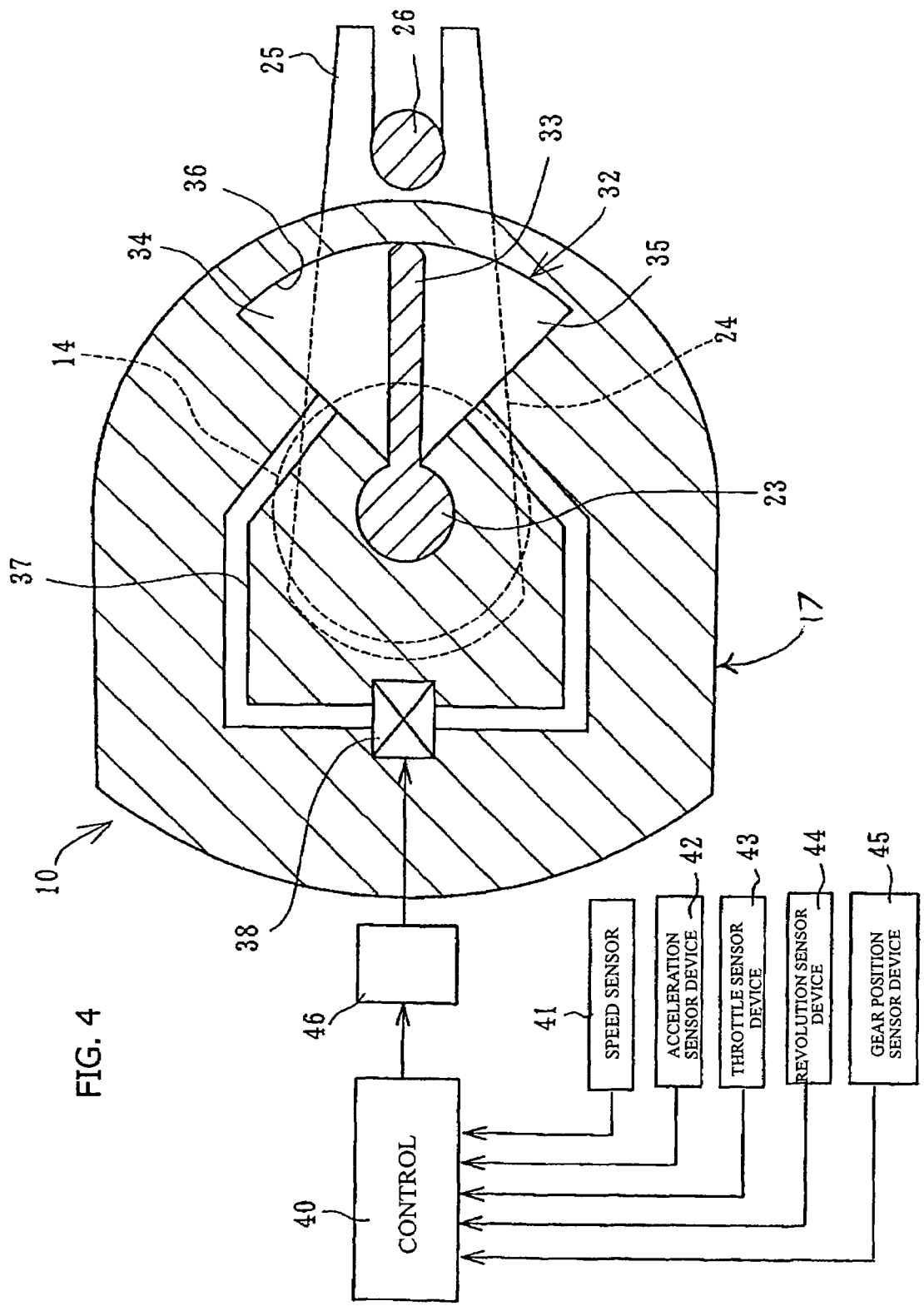
FIG. 4 is a schematic view of a steering damper showing the bypass passage for the liquid chamber, as well as the sensor inputs to the controller.

FIG. 4 schematically shows the structure of the steering damper 10, in which a liquid chamber 32, fan-shaped so as to widen at the rear portion thereof, is provided inside the main damper body 17. The steering damper 10 also includes the shaft 23 which provides a pivot support for a wing portion 33. The inside of the liquid chamber 32 is divided into a right liquid chamber 34 and a left liquid chamber 35 by the wing portion 33, which extends integrally backward from the shaft 23.

A tip end of the wing portion 33 constitutes a sliding surface, which slidably abuts on an inner surface of an arc wall 36 of the liquid chamber 32. An incompressible liquid, such as oil, is provided in the right liquid chamber 34 and the left liquid chamber 35, which are connected to each other by a bypass passage 37. A variable valve 38 is provided in the middle of the bypass passage 37. The variable valve 38 includes an adjustable passage for limiting fluid flow therethrough to generate a damping force, and a linear solenoid for changing a cross-sectional passage area of this adjustable passage, and thereby adjusting the damping force. The linear solenoid is configured to change the cross-sectional passage area of the adjustable passage depending on a control current supplied thereto. The linear solenoid is also configured to change the damping force. The control current is controlled by an electronic control unit (ECU) 40.

A maximum value C2 of the damping force in the steering damper 10 is determined either by a hardware limit value or by a software limit value.

The hardware limit value is a limit value that is determined by the structure of the steering damper 10. For example, the hardware limit value is determined by capacities of the liquid chambers 34 and 35, a pressure-receiving area of the wing portion 35, the cross-sectional passage area of the variable valve 38 when narrowed to the minimum, as well as a maximum output of the linear solenoid, and the like.

The software limit value is a maximum value to be determined by a control consideration, in spite of being the damping force smaller than the hardware limit value, which constitutes an upper limit in terms of control even if the hardware limit value still has a margin.

This embodiment can apply any of the limit values. A maximum value C2 in this embodiment is set to a range sufficient for maintaining a fail-safe principle. Specifically, the maximum value C2 is set so that it does not cause a problem for steering even if the damping force stays at the maximum value C2 for some reason.

Here, the damping force of the steering damper 10 varies depending on the drift velocity (flow rate/time) of the liquid passing through the adjustable passage of the variable valve 38. That is, even when the same amount of the liquid passes through the adjustable passage having the same cross-sectional passage area, the generated damping force will not grow very large if the liquid moves over time. On the contrary, the damping force grows large upon rapid movement in a short time period.

The drift velocity is generated by the turning speed of the wing portion 35, that is, the turning speed of the steering shaft 14. The turning speed of the steering shaft 14 is influenced more by an external factor, for example an impact load resulting in a kickback, than by artificial manipulation such as manual turning of the handlebar 4. This means that the generated damping force varies between an event of normal handling and an event of a kickback input, while the degree of adjustability in the variable valve 38 is the same. Accordingly, the damping force in this application will be defined by setting the turning speed of the steering shaft 14 at the time of artificial handling to a predetermined value, and will be measured under a condition of the constant turning speed of this steering shaft 14.

The ECU 40 is formed of a microcomputer and the like, and performs control based on respective detection signals of a variety of sensors. These sensors include a speed sensor 41, an acceleration sensor 42, and moreover, a throttle sensor 43, a rotary speed sensor 44, a gear position sensor 45, and the like. The control device changes the degree of narrowing of the variable valve 38 and adjusts the damping force by instructing a current control portion 46 to direct a given control current onto the linear solenoid of the variable valve 38 under a given condition to be described later. A method of controlling the damping force of the steering damper 10 by the ECU 40 will be performed based on the vehicle speed and will be adjusted by partially considering the acceleration. Method details will be described subsequently herein.

All the respective sensors configured to send the detection signals to the ECU 40 are conventional. Among them, the speed sensor 41 detects the vehicle speed by monitoring the number of revolutions of an output sprocket of the engine, and the like. The acceleration sensor 42 is a G sensor configured to detect the acceleration of the vehicle body, and is provided in an appropriate position of the vehicle body. The throttle sensor 43 detects a degree of aperture of a throttle provided on an air intake passage. The rotary speed sensor 44 detects the number of revolutions of a crank shaft. The gear position sensor 45 detects a current gear position of a transmission.

Alternatively, it is also possible to calculate the vehicle body speed based on results of detection of the rotary speed sensor 44, for detecting the number of revolutions of the engine, and of the gear position sensor 45 for detecting the gear position. In this way, it is possible to use the rotary speed sensor 44 and the gear position sensor 45 instead of the speed sensor 41. Moreover, by calculating the acceleration as unit time variation of the vehicle speed calculated based on the speed sensor 41, it is possible to use the speed sensor 41 instead of the acceleration sensor 42. In this way, it is not necessary to provide the specialized speed sensor 41, and in particular the acceleration sensor 42, and the vehicle speed and the acceleration can still be accurately detected.

Accordingly, it is possible to generate the appropriate damping force of the steering damper.

Figure 5:
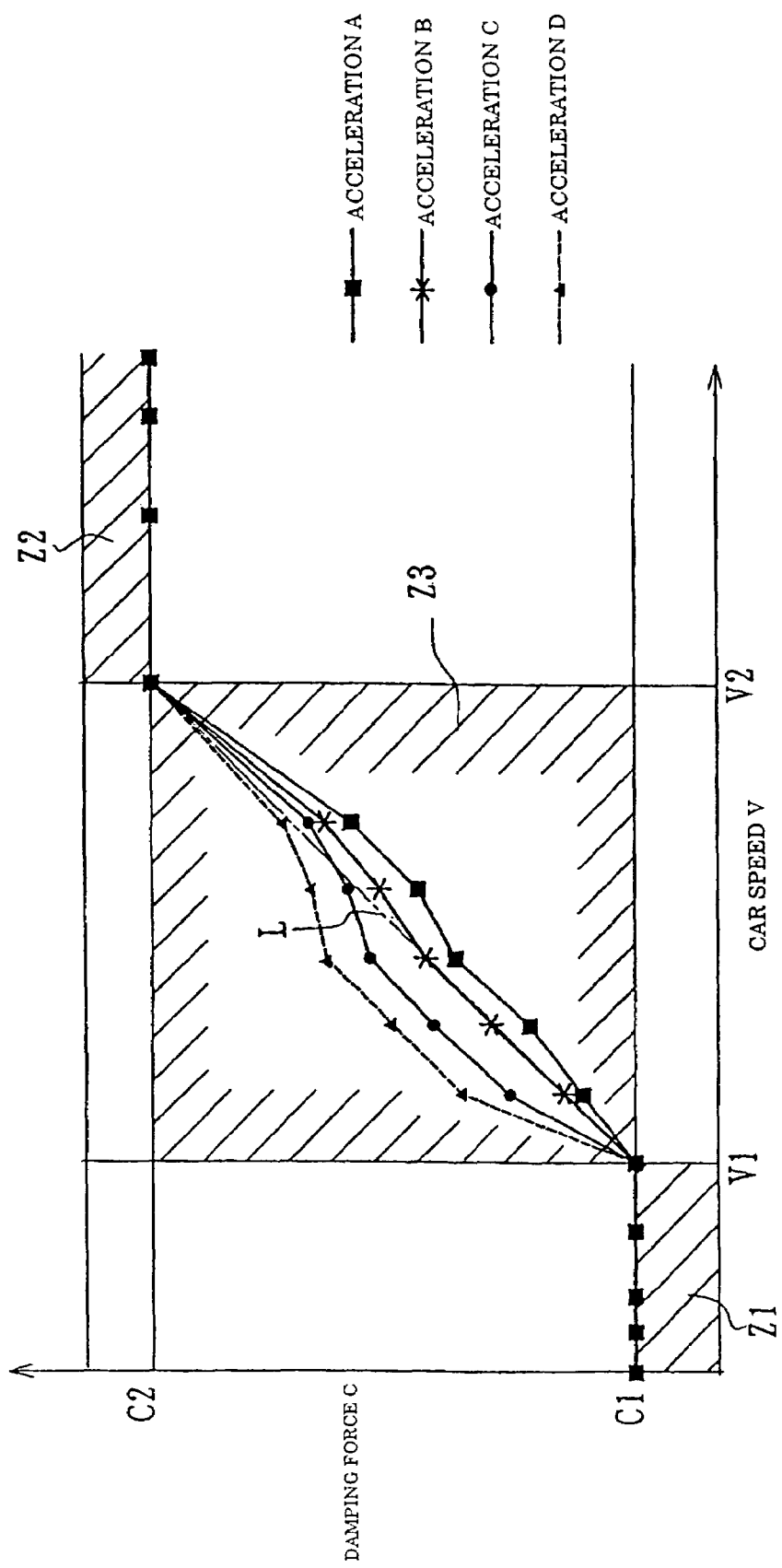
FIG. 5 is a graph of car speed versus damping force, showing the three ranges of damping force, and in the intermediate range Z3 showing the effect of acceleration on damping force.

Next, a method of adjusting the damping force will be described. FIG. 5 is a graph showing this method, in which the ECU 40 controls the damping force depending on the vehicle speed, and adjusts the damping force by taking the acceleration into consideration. Specifically, the damping force is fixed to a minimum value C1 when the vehicle speed is in a low speed range. The low speed range is defined to be equal to or below first reference speed V1. The damping force is further fixed to a maximum value C2 when the vehicle speed is in a high speed range. The high speed range range is defined to be equal to or above a second reference speed V2. An intermediate vehicle speed range lies between the first reference speed V1 and the second reference speed V2. In the intermediate vehicle speed range, the damping force changes continuously depending on the vehicle speed and the acceleration.

The damping force is divided into three ranges. The first range is a low speed side fixation range Z1 in which the damping force is fixed to the minimum value C1 at speed equal to or below the first reference speed V1. The second range is a high speed side fixation range Z2 in which the damping force is fixed to the maximum value C2 at speed equal to or above the second reference speed V2. The third range is an intermediate variation range Z3 in which the damping force is set to a variable value between C1 and C2 in a speed range between V1 and V2.

In the intermediate variation range Z3, the variation in the damping force relative to the vehicle speed forms a curved shape, which is drawn as a nonlinear curved line (hereinafter referred to as an intermediate curved line) having at least a certain portion deviated upward or downward relative to a reference straight line L connecting the minimum value C1, representing the damping force at the first reference speed V1, and the maximum value C2, representing the damping force at the second reference speed V2.

Moreover, this intermediate curved line varies depending on the acceleration. That is, assuming that the intermediate lines shown as examples take four different acceleration values A to D, and that the acceleration values A to D are in ascending order, the case of the smallest acceleration A among these intermediate curved lines always varies below the reference straight line L.

The intermediate curved line for the acceleration B, which is slightly greater than A, is almost aligned with the reference straight line L at a low speed side but is deviated downward from the reference straight line L at a high speed side. The intermediate curved line for the acceleration C, which is greater than B, is deviated upward from the reference straight line L at the low speed side but is deviated downward from the reference straight line L at the high speed side. The intermediate curved line for the acceleration D, which is the largest of the acceleration values shown in the example, always varies above the reference straight line L.

In this embodiment, in any of the intermediate curved lines, the damping force is equal to the minimum value C1 at the first reference speed V1 and the damping force is equal to the maximum value C2 at the second reference speed V2. In addition, when the damping force is not adjusted by taking into account the acceleration along with the vehicle speed, or in other words, when the damping force is adjusted based only on the vehicle speed, for example, the damping force may be changed along a non-straight line. This non-straight line includes a straight line portion parallel to a horizontal axis (the vehicle speed) at the constant damping force equal to C1, connects to and includes the reference straight line L, and also connects to and includes a straight line portion parallel to the horizontal axis at the constant damping force equal to C2. However, in this case as well, it is possible to define the intermediate variation range Z3 as a nonlinear intermediate curved line instead of the reference straight line L.

The low speed side fixation range Z1 maintains the damping force at the minimum value C1 in the low speed range. In the low speed range, it is important to give priority to allowing finer maneuverability of the vehicle body rather than using the steering damper apparatus to suppress deflection of the handlebar 4, that is, it is important to provide nimble handling while turning and such. In this way, nimble handling is effectuated. The first reference speed V1 is the upper limit speed of the range Z1 when maintaining the damping force at the minimum value C1 without corresponding to the variation in the vehicle speed. The first reference speed V1 is a lower boundary speed for the intermediate vehicle speed range. At speeds exceeding speed V1, it is not appropriate any more to give priority consideration to the handling and it is necessary to generate the damping force greater than C1 and thereby to suppress deflection of the handlebar 4. The first reference speed V1 is arbitrarily determined in response to specifications of the vehicle together with the minimum value C1 of the damping force. For example, V1 may be set at approximately 80 km/h or the like.

On the other hand, the high speed side fixation range Z2 maintains the damping force at the maximum value C2 and suppresses the deflection of the handlebar in a high speed range. In the high speed range it is important to give priority to suppression of the deflection of the handlebar 4 due to artificial manipulation as much as possible by increasing the steering damper apparatus-induced load on the handlebar 4, such as when driving straight at high speed, and where a large handlebar operation is not required. The second reference speed V2 is the lower limit speed of the range Z2 when maintaining the damping force at the maximum value C2 without corresponding to the variation in the vehicle speed. The second reference speed V2 is an upper boundary speed for the intermediate vehicle speed range. At speeds below V2, it is necessary to reduce the damping force and to lighten the load for operating the handlebar as there are more chances to perform somewhat large handlebar operations when moving below this speed. The second reference speed V2 is arbitrarily determined in response to the specifications of the vehicle in the range where it is essential to give priority to the maintenance of the movement of the vehicle body as compared to suppression of deflection of the handlebar of the vehicle. For example, the second reference speed V2 may be set at approximately 200 km/h or the like.

In addition, the maximum value C2 of the damping force is an upper limit value of the damping force, which is set to maximize the load on the handlebar so as to allow handing to the extent necessary for driving, while substantially suppressing deflection of the handlebar 4, and to the extent to bring about a sense of considerable weight for handling. Here, when the damping force is equal to the maximum value C2, it is by all means possible to suppress the kickback which occurs due to the impact load inputted to the front wheel. The maximum value C2, which is the upper limit value of the damping force, may be either equal to the hardware limit value or equal to the software limit value as described previously.

The intermediate vehicle speed range is a speed range in which the steering damper apparatus is required to adjust the load on the handlebar 4 to an optimal value relative to the vehicle speed thereof and the acceleration. This adjustment is provided in a balanced manner so as to achieve suppression of the kickback, in addition to a handling property and suppression of deflection of the handlebar 4. Generally, in the intermediate vehicle speed range, a larger damping force is required as the vehicle speed and the acceleration are increased. That is, the damping force is increased more to suppress deflection of the handlebar along with an increase in the vehicle speed. At the same time, when the acceleration is increased, the portion of the shared vehicle load on the front wheel is reduced, and thus occurrence of kickback tends to be more frequent. Accordingly, by increasing the damping force beforehand in response to the increase in the acceleration, it is possible to suppress deflection of the handlebar 4 even if the kickback occurs as a result of an input of the impact load from a road surface. In this way, it is possible to address the kickback by adjusting the damping force corresponding to changes in the acceleration.

The minimum value C1 is the damping force which aims at minimizing the load on the handlebar 4, thereby achieving nimble handling instead of suppression of deflection of the handlebar 4, so as to damp steering only corresponding to a particularly large kickback. That is, there is very little flow resistance of the liquid in the variable valve 38 at the turning speed of the steering shaft 14 in normal handling. Accordingly, a handlebar operation load is set to as small damping force as possible so as to be substantially the same as an operation load as would be generated by friction resistance at a bearing portion for the steering shaft 14.

However, even when the damping force is set to the minimum value C1 as described above, the steering shaft 14 is apt to rotate at a rapid speed when an external force is applied to the front wheel. For example, as a result of an impact load upon an input of an extremely large kickback, the turning speed reaches an abnormal value greater than the turning speed which is a condition for measuring the damping force used as the basis for determination of the minimum value C1. Accordingly, the flow resistance in the variable valve 38 is set to be temporarily increased to generate large damping force, so as to be able to suppress deflection of the handlebar due to the kickback by this large damping force. The magnitude of the kickback to be suppressed in this case can be arbitrarily set in accordance with intended use of the vehicle and the like.

Figure 6:
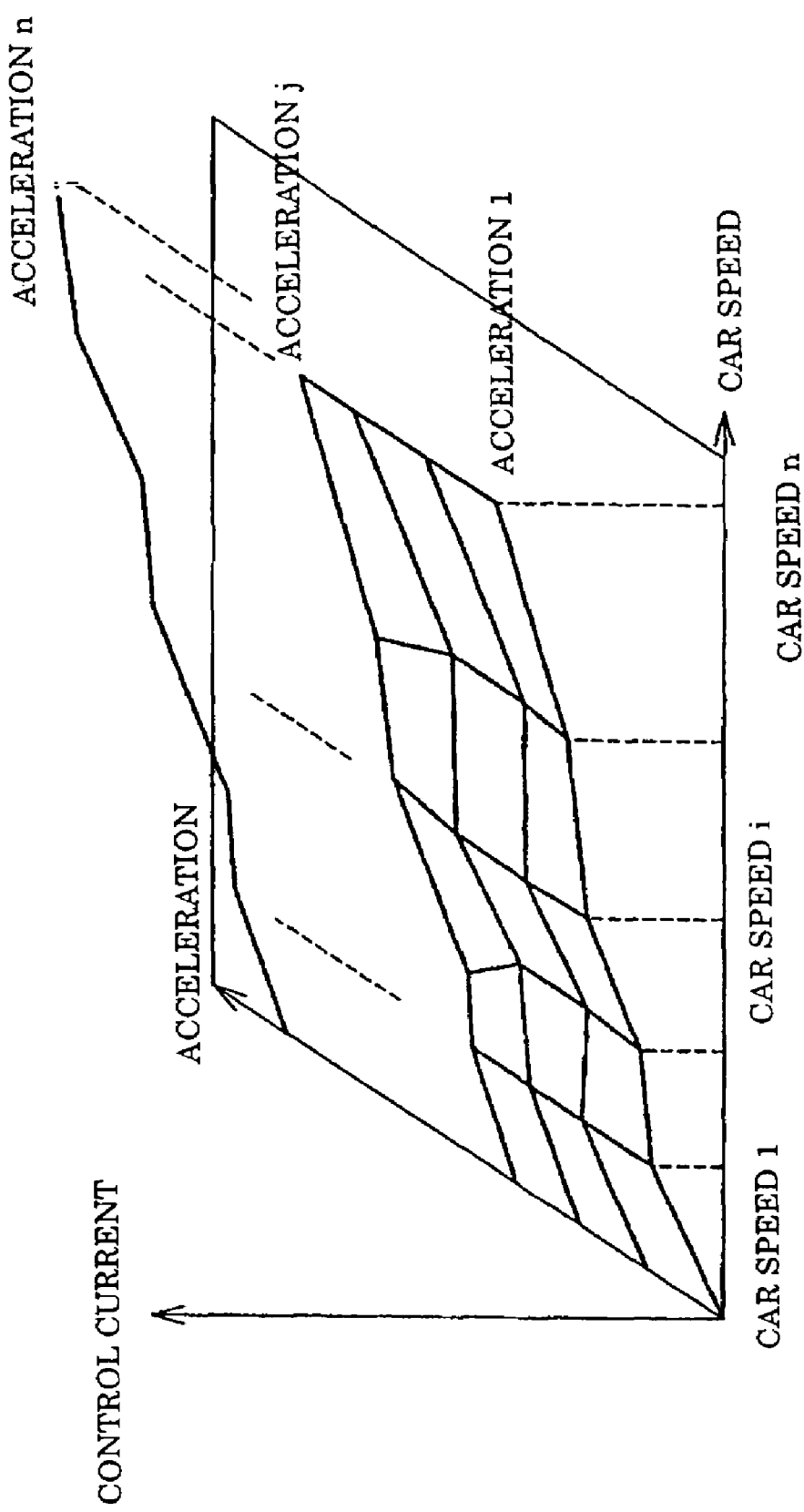
FIG. 6 is a three-dimensional graph of car speed and acceleration versus control current, providing a control current map.

FIG. 6 shows a control current map which constitutes a basis for controlling the damping force applying two variables, the vehicle speed and the acceleration, as parameters in the intermediate variation range Z3. Specifically, the damping force is changed by narrowing the variable valve 38, and this narrowing operation is adjusted by the linear solenoid which is part of the variable valve 38. Moreover, the linear solenoid is controlled to operate corresponding to a control current. This control current is determined by the control current map defined in the ECU 40 in advance, and is controlled by the current control portion 46.

The control current map is a three-dimensional map of the vehicle speed V on the lateral horizontal axis, the acceleration A on the longitudinal horizontal axis, and the control current I on the vertical axis. The control current is determined by lattice points of the vehicle speed and the acceleration. Specifically, as shown in FIG. 7 in which numerical values of the control current map are arranged in a two-dimensional table, and in which a variation in vehicle speed lattice point is described as $1 \ldots i \ldots n$ while a variation in acceleration point is described as $1 \ldots j \ldots n$, the control current will be defined as an intersecting point of these lattice points. For example, when the vehicle speed lattice point is i and the acceleration lattice point is j, the control current is equal to a value determined at a point (i, j) in advance. The control current at each lattice point is determined in advance by experiment. This control current is determined so as to adjust the load on the handlebar 4 to be an optimal value relative to the vehicle speed and the acceleration thereof. Moreover, when determining the control current at an intermediate point between the lattice points, the control current is determined by a four-point interpolation calculation based on values of the four closest lattice points. It will be understood form FIGS. 5-6 that, the current control map having the two-dimensional table of predetermined current values may be associated with specific vehicle speeds less than or equal to the first reference speed and greater than or equal to the second reference speed, and the calculation of control current is accomplished by the controller referencing the table to obtain a control current associated with the acquired vehicle speed.

Figure 8:
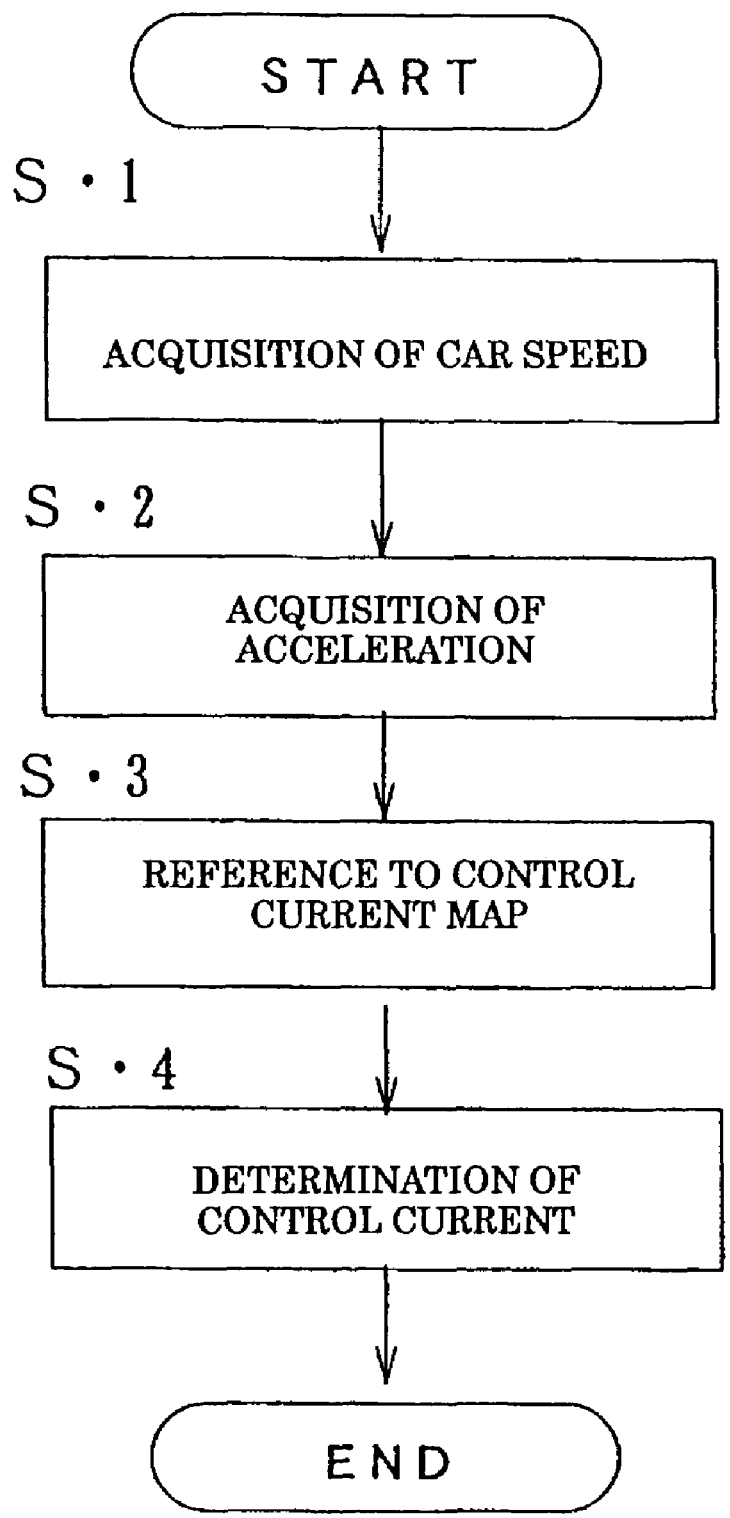
FIG. 8 is a flowchart showing a method for determination of a control current.

FIG. 8 shows a method for determination of the control current in the ECU 40. At step S1, the ECU 40 acquires the vehicle speed from the speed sensor 41. At step S2, the ECU 40 acquires the acceleration from the acceleration sensor 42. At step S3, the ECU 40 references the control current map based on these detected values. At step S4, the ECU 40 determines the appropriate control current. In this case, the four-point interpolation calculation is carried out when appropriate. The determined control current is given to the linear solenoid. The single execution of the method for determination of the control current is completed by determining this control current. However, this method for determination of the control current is repeatedly executed at a given time interval when the vehicle is running.

Next, operation of this embodiment will be described. When the vehicle is running, the respective detection signals are constantly inputted from the speed sensor 41 and the acceleration sensor 42 to the ECU 40. The control current is then determined by means of comparison with the control current map based on the vehicle speed and the acceleration thus detected, and the linear solenoid is controlled by the control current to adjust the degree of narrowing of the variable valve 38 relative to the bypass passage 37, thereby adjusting the damping force of the steering damper 10.

When the vehicle speed is equal to or below the first reference speed V1, the damping force is in the low speed side fixation range Z1, and the damping force of the steering damper 10 is fixed to the minimum value C1 to minimize the load on the handlebar 4. For this reason, it is possible to achieve nimble handling in the low speed range at the time of a turn, for example, where it is important to give priority to finer maneuverability of the vehicle body as compared to the demand for suppressing deflection of the handlebar 4.

When the vehicle speed is equal to or above the second reference speed V2, the damping force is in the high speed side fixation range Z2, and the damping force of the steering damper 10 is fixed to the maximum value C2 to maximize the load on the handlebar 4. Accordingly, deflection of the handlebar 4 is suppressed and the stable movement of the vehicle body is maintained in the high speed range. In this range, it is important to give priority to suppression of the deflection of the handlebar 4 due to artificial manipulation as much as possible by increasing the steering damper apparatus-induced load on the handlebar 4, such as when driving straight at high speed, and where a large handlebar operation is not required.

In the intermediate variation range Z3 where the vehicle speed is above the first reference speed V1 but below the second reference speed V2, the damping force of the steering damper 10 is variably adjusted in response to both the vehicle speed and the acceleration. The damping force is adjusted corresponding to the acceleration to prepare for occurrence of kickback; accordingly, it is possible to suppress deflection of the handlebar 4 at the time of occurrence.

In this case, as shown in the intermediate curved lines A to D of FIG. 5, the damping force is adjusted to be slightly larger than the reference straight line L for an increase in the acceleration. Accordingly, even if a large kickback occurs in response to the increase in the acceleration, it is possible to prepare for this in advance. In addition, by controlling force according to the nonlinear curved line, it is possible to perform adjustment so as to generate the optimal damping force in response to the magnitude of the vehicle speed and of the acceleration.

Moreover, since the damping force is determined by use of the control current map as shown in FIG. 6, it is possible to adjust the damping force in the intermediate variation range Z3 so as to harmonize maneuverability of the handgrip, stability of the handgrip, and suppression of kickback in a good balance, and thereby to adjust the load on the handlebar to an optimal value relative to the vehicle speed and the acceleration.

Note that the present invention is not limited to the above-described embodiment and various modifications and applications are possible within the principle of the invention. For example, it is possible to adjust the damping force based only on the vehicle speed without accommodating for the acceleration. In this case as well, it is possible to achieve the nimble handling property in the low speed side fixation range Z1, suppression of the deflection of the handlebar in the high speed side fixation region Z2, and the balance of these factors in the intermediate variation region Z3.

Moreover, in the intermediate variation range Z3, the steering damping device is not limited to control the damping force continuously only in this region while using the vehicle speed and the acceleration as the parameters as described previously, but it is also possible to adjust the damping force to a large state only when the detected acceleration becomes a given large state. Furthermore, various publicly known structures are applicable to the structure of the steering damper 10, more particularly, to the structure for generating the damping force. In addition, the variable valve 38 is not limited to the linear solenoid, and various conventional structures are similarly applicable.

While a working example of the present invention has been described above, the present invention is not limited to the working example described above, but various design alterations may be carried out without departing from the present invention as set forth in the claims.

We claim:

1. A steering damper apparatus for a vehicle having a vehicle body, a front wheel steering system supported by a front portion of the vehicle body, and a vehicle speed sensor for sensing an instantaneous speed of the vehicle, said steering damper apparatus comprising:

a steering damper for applying a variably adjustable damping force to pivotal movement of a component of the front wheel steering system; and a controller operable to adjustably control the damping force applied by the steering damper, wherein the controller is operable to adjust the damping force based on vehicle speed, wherein:

the damping force is set to a minimum value when vehicle speed is at or below a first reference speed, and the damping force is set to a maximum value when the vehicle speed is at or above a second reference speed which is greater than the first reference speed; and wherein the steering damper apparatus further comprises a current control map having a two-dimensional table of predetermined current values associated with specific vehicle speeds less than or equal to the first reference speed and greater than or equal to the second reference speed, and wherein the calculation of control current is accomplished by the controller referencing said table to obtain a control current associated with the acquired vehicle speed.

2. The steering damper apparatus according to claim 1, wherein the controller is operable to variably adjust the damping force in response to a variation in the vehicle speed when the vehicle speed is in an intermediate speed range between the first reference speed and the second reference speed.

3. The steering damper apparatus according to claim 2, wherein the controller is operable to vary the damping force depending on both the speed and the acceleration of the vehicle, when the vehicle speed is in the intermediate speed range.

4. The steering damper apparatus according to claim 2, wherein the controller is operable to adjust the damping force to a high level, when the acceleration of the vehicle is at a high level and the vehicle speed is in the intermediate speed range.

5. A steering damper apparatus for a vehicle having a vehicle speed sensor for sensing an instantaneous speed of the vehicle and an acceleration sensor for sensing an acceleration of the vehicle, the steering damper apparatus comprising
a damper; and
a controller,
wherein the controller is operable to control the damping force applied by the damper, and
wherein the controller adjusts the damping force based on vehicle speed detected by the vehicle speed sensor, in a manner such that the damping force is provided in a non-linear relation to the vehicle speedy; and
wherein the steering damper apparatus further comprises a current control map having a two-dimensional table of predetermined current values associated with specific vehicle speeds and accelerations, and wherein the calculation of control current is accomplished by the controller referencing said table to obtain a control current associated with the acquired vehicle speed and acceleration.

6. The steering damper apparatus of claim 5, wherein the damping force applicable by the damper is limited to an upper limit force, and wherein the upper limit force is determined by one of a hardware limit value and a software limit value;
wherein the hardware limit value is related to the structure and capacity of the damper, and the software limit value is related to the output of the controller.

7. The damper apparatus of claim 5, wherein the damper comprises
a wing member pivotally secured within a fluid chamber so as to separate the fluid chamber into a first portion and a second portion;
a fluid channel which connects the first portion and the second portion; and
a valve member disposed in the fluid channel for controlling fluid flow through the fluid channel;

wherein the valve member is operatively connected to, and controlled by the controller.

8. The damper apparatus of claim 5,
wherein the controller is operable to maintain the damping force applied by the damper at a first constant value C1 during vehicle operation at or below a first speed V1,
wherein the controller is operable to maintain the damping force applied by the damper at a second constant value C2 during vehicle operation at or above a second speed V2, and
wherein the controller is operable to vary the damping force applied by the damper between the first constant value C1 and the second constant value C2 during vehicle operation in an intermediate speed range between the first speed V1 and the second speed V2.

9. The damper apparatus of claim 8, wherein the controller is operable to variably adjust the damping force applied by the damper in relation to vehicle speed during vehicle operation between the first speed V1 and the second speed V2.

10. The damper apparatus of claim 8, wherein the damping force is varied linearly in correspondence with vehicle speed so as to increase with increasing speed during vehicle operation between the first speed V1 and the second speed V2.

11. The damper apparatus of claim 8, wherein the damping force is varied non-linearly in correspondence with vehicle speed so as to increase with increasing speed during vehicle operation between the first speed V1 and the second speed V2.

12. The damper apparatus of claim 8, wherein the damping force is varied in correspondence with vehicle speed and vehicle acceleration during vehicle operation between the first speed V1 and the second speed V2.

13. The damper apparatus of claim 8, wherein the damping force is varied in correspondence with vehicle speed and vehicle acceleration during vehicle operation between the first speed V1 and the second speed V2 so as to increase non-linearly.

14. A method of controlling steering damping on a vehicle, the vehicle comprising a vehicle speed sensor, a vehicle acceleration sensor, and a steering damper apparatus, the steering damper apparatus comprising a damper and a controller, wherein the method steps comprise:
step 1) acquiring output from the vehicle speed sensor by the controller,
step 2) acquiring output from the vehicle acceleration sensor by the controller,
step 3) calculating a control current for the controller, based on the output from the vehicle speed sensor and vehicle acceleration sensor, and
step 4) providing the calculated control current from the controller to the damper,
wherein the control current effects the damper so as to produce a damping force,
wherein the damping force is maintained at a first constant value C1 during vehicle operation at or below a first speed V1,
wherein the damping force is maintained at a second constant value C2 during vehicle operation at or above a second speed V2; and
wherein the steering damper apparatus comprises a current control map, wherein the current control map comprises a two-dimensional table of predetermined current values associated with specific vehicle velocities and specific vehicle accelerations, and wherein the calculation of control current is accomplished by the controller referencing said table to obtain a control current associated with the acquired vehicle speed and acceleration.

15. The method of controlling damping of steering for a vehicle of claim 14, wherein the control current effects the damper so as to produce a damping force wherein the damping force varies between the first constant value C1 and the second constant value C2 during vehicle operation between the first speed V1 and the second speed V2.

16. The method of controlling damping of steering for a vehicle of claim 15 wherein the damping force is varied in correspondence with vehicle speed and vehicle acceleration during vehicle operation between the first speed V1 and the second speed V2.

17. The method of controlling damping of steering for a vehicle of claim 15 wherein the damping force is varied in correspondence with vehicle speed and vehicle acceleration during vehicle operation between the first speed V1 and the second speed V2 so as to increase non-linearly.

* * * * *